United States Patent
Shvodian (10) Patent No.: US 11,570,776 B1
(45) Date of Patent: Jan. 31, 2023

(54) CARRIER AGGREGATION WITH NARROW BANDWIDTH CARRIERS

(71) Applicant: Sprint Spectrum LP, Overland Park, KS (US)

(72) Inventor: William Shvodian, McLean, VA (US)

(73) Assignee: Sprint Spectrum LP, Overland Park, KS (US)

(*) Notice: Subject to any disclaimer, the term of this patent is extended or adjusted under 35 U.S.C. 154(b) by 245 days.

(21) Appl. No.: 16/791,032

(22) Filed: Feb. 14, 2020

(51) Int. Cl.
*H04W 72/12* (2009.01)
*H04W 72/04* (2009.01)
*H04J 11/00* (2006.01)

(52) U.S. Cl.
CPC ........ *H04W 72/0453* (2013.01); *H04W 72/12* (2013.01); *H04J 11/0073* (2013.01)

(58) Field of Classification Search
CPC .......................... H04W 72/0453; H04W 72/12
See application file for complete search history.

(56) References Cited

U.S. PATENT DOCUMENTS

| | | | | |
|---|---|---|---|---|
| 2014/0307701 A1* | 10/2014 | Markwart | ......... | H04W 72/0493 370/329 |
| 2015/0373725 A1* | 12/2015 | Oh | ............................ | H04L 5/14 370/280 |
| 2019/0280843 A1 | 9/2019 | Jeon et al. | | |

* cited by examiner

*Primary Examiner* — Angel T Brockman
(74) *Attorney, Agent, or Firm* — Jones Robb, PLLC (57) ABSTRACT

Performing carrier aggregation with narrow bandwidth carriers includes determining that a spectrum block allocated to a sector has a bandwidth that is narrower than a threshold bandwidth, wherein the threshold bandwidth is based on a size of a synchronization signal block (SSB), configuring the spectrum block as a narrow bandwidth carrier, performing carrier aggregation with the narrow bandwidth carrier as a secondary component carrier aggregated with the primary component carrier, and scheduling the SSB within the primary component carrier.

18 Claims, 6 Drawing Sheets

CARRIER AGGREGATION WITH NARROW BANDWIDTH CARRIERS

TECHNICAL BACKGROUND

In order to allow for greater wireless network throughput and efficiency, wireless network operators can implement carrier aggregation, i.e. enabling wireless devices and access nodes to communicate using a combination of carriers known as component carriers. Component carriers utilize air-interface resources (such as time-frequency resource blocks) spanning different sets of frequencies within one or more frequency bands available to use within a wireless sector. For example, a primary component carrier may utilize a first set of frequencies, and a secondary component carrier may utilize a second set of frequencies. When two or more component carriers are in the same frequency band, it is referred to as "intra-band carrier aggregation" whereas when the component carriers are parts of different frequency bands, it is referred to as "inter-band carrier aggregation." Further, synchronization signals may be used to synchronize transmissions between the network and the wireless devices. For example, in 5G New Radio (NR) wireless networks, a synchronization signal block utilizes a portion of the air-interface resources of one or more component carriers to synchronize the transmissions. Wireless devices attached to the sector using carrier aggregation can refer to the synchronization signal block to be able to receive transmissions via two or more component carriers.

There may be situations where differently-sized portions of an available spectrum of air interface resources are allocated to a sector. Some portions may have a bandwidth (i.e. range of available frequencies) that is too narrow to fit synchronization signals. Thus, the sector may be configured with a minimum possible bandwidth to be able to utilize a carrier for carrier aggregation. For instance, in 5G NR, there is a minimum channel bandwidth that is determined by the ability to fit a synchronization signal block. However, there may be certain spectrum allocations that have a bandwidth narrower than the size of the synchronization signal block. Thus, these narrow portions of available resources cannot currently be used for NR. While these narrow portions are available for other narrowband transmissions (such as internet of things, etc.), they may otherwise be wasted due to their inability to be used for NR.

Overview

Exemplary embodiments described herein include systems, methods, and processing nodes for performing carrier aggregation with narrow bandwidth carriers. An exemplary method described herein for performing carrier aggregation with narrow bandwidth carriers includes determining that a spectrum block allocated to a sector has a bandwidth that is narrower than a threshold bandwidth, wherein the sector is configured to deploy a primary component carrier to which wireless devices within the sector are attached, configuring the spectrum block as a narrow bandwidth carrier, and performing carrier aggregation with the narrow bandwidth carrier as a secondary component carrier aggregated with the primary component carrier.

An exemplary system described herein for performing carrier aggregation with narrow bandwidth carriers includes a processing node and a processor coupled to the processing node. The processor is configured to perform operations including determining that a bandwidth of an available spectrum allocated to a wireless sector is unable to accommodate synchronization signals, configuring the available spectrum as a secondary component carrier, and scheduling the synchronization signals within a primary component carrier of the wireless sector.

An exemplary processing node described herein for performing carrier aggregation with narrow bandwidth carriers is configured to perform operations comprising determining that a spectrum block allocated to a sector has a bandwidth that is narrower than a threshold bandwidth, wherein the threshold bandwidth is based on a size of a synchronization signal block (SSB), configuring the spectrum block as a narrow bandwidth carrier, performing carrier aggregation with the narrow bandwidth carrier as a secondary component carrier aggregated with the primary component carrier, and scheduling the SSB within the primary component carrier.

DETAILED DESCRIPTION

Exemplary embodiments described herein include systems, methods, and processing nodes for creating narrow bandwidth carriers using available resources within a sector. Allocated portions of radiofrequency resources that are too narrow for synchronization signals can be configured as secondary carriers and aggregated with primary carriers that have wider bandwidths. Since the synchronization signals (e.g. SSB) can be scheduled in the primary carriers, these narrow-bandwidth secondary carriers can be made usable for any type of wireless device capable of carrier aggregation, in contrast to the present state of the art where these resources cannot be used as carriers, or can only be used for narrowband transmissions like IoT, etc. These and other embodiments are further described herein and with reference to FIGS. 1-6.

Figure 1:
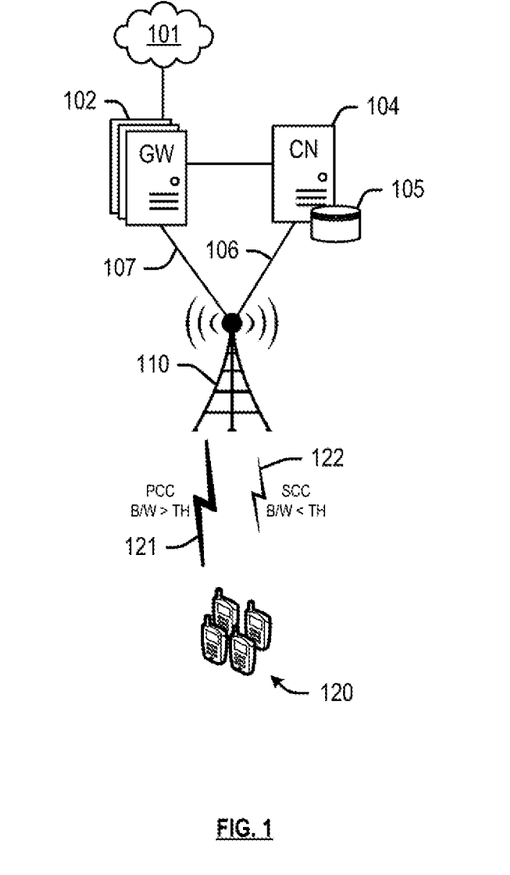
FIG. 1 depicts an exemplary system for performing carrier aggregation with narrow bandwidth carriers.

FIG. 1 depicts an exemplary system 100 comprising a communication network 101, gateway 102, controller node 104, access node 110, and wireless devices 120. Access node 110 can be any network node configured to provide communication between wireless devices 120 and communication network 101, including standard access nodes such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. Alternatively, access node 110 may comprise a short range, low power, small-cell access node such as a microcell access node, a picocell access node, a femtocell access node, or a home eNodeB device. In other embodiments, any other combination of access nodes and wireless devices may be evident to those having ordinary skill in the art in light of this disclosure.

In operation, access node 110 (or any other network node communicably coupled thereto) can be configured to perform carrier aggregation using narrow bandwidth carriers, by determining that a spectrum block allocated to a sector of access node 110 has a bandwidth that is narrower than a threshold bandwidth. For example, the access node can be configured to deploy a primary component carrier 121, to which wireless devices within the sector are attached. Primary component carrier 121 can include frequency resources that have a bandwidth sufficient to support control signaling for primary component carrier 121, including synchronization signaling for carrier aggregation purposes. Further, there may be additional frequency resources allocated for use by access node 110, the additional frequency resources being sufficiently narrow that they are unable to be used as an independent or primary component carrier, since they cannot accommodate the necessary signaling transmissions. Thus, the available resources can be configured as a narrow bandwidth carrier 122, and a carrier aggregation mode is initiated with the narrow bandwidth carrier 122 as a secondary component carrier aggregated with the primary component carrier 121.

Determining that the frequency resources of the available spectrum block span a sufficiently narrow bandwidth can be based on comparison with a threshold bandwidth. For example, the threshold bandwidth can include any bandwidth that is wide enough to accommodate synchronization signals for carrier aggregation. If the additional frequency resources span a bandwidth that is narrower than the threshold bandwidth, then they are configured as narrowband carrier 122 and aggregated with the primary component carrier 121. Further, the synchronization signals for carrier aggregation are scheduled using the primary component carrier 121. The synchronizations signals enable wireless devices 120 to receive a data stream using both component carriers 121, 122. In an exemplary embodiment, the synchronization signals comprise a synchronization signal block (SSB). The SSB can include synchronization signals along with a physical broadcast channel (PBCH) that is configured to transmit a master information block (MIB). The synchronization signals can include primary synchronization signals (PSS) and secondary synchronization signals (SSS). Further, the threshold bandwidth can be based on a subcarrier spacing associated with the spectrum block (or frequency band associated with the spectrum block). For example, if the subcarrier spacing is 15 kHz, a corresponding SSB would require 3.6 MHz, and if the subcarrier spacing is 30 kHz, the corresponding SSB would require 7.2 MHz. Due to the numerology of 5G NR (as is known to those having ordinary skill in the art), a 15 kHz subcarrier spacing is associated with a minimum channel bandwidth of 5 MHz, and a 30 kHz subcarrier spacing is associated with a minimum channel bandwidth of 10 MHz. Thus, in exemplary embodiments, a minimum threshold bandwidth for a 15 kHz subcarrier spacing carrier is 5 MHz, and a minimum threshold bandwidth for a 30 kHz subcarrier spacing carrier is 10 MHz. In other words, the threshold bandwidth against which the available spectrum block is compared varies based on a subcarrier spacing utilized by the access node and, correspondingly, a channel bandwidth associated with the subcarrier spacing. In light of the above, additional minimum threshold bandwidths for different subcarrier spacings will be evident to those having ordinary skill in the art. For example, if the subcarrier spacing is 60 kHz, a corresponding SSB would require 14.4 MHz, if the subcarrier spacing is 120 kHz, the corresponding SSB would require 28.8 MHz, if the subcarrier spacing is 240 kHz, the corresponding SSB would require 57.6 MHz, and so on.

Further, the available spectrum block used to form secondary carrier 122 uses the same frequency band as the primary component carrier 121. This is because the synchronization between component carriers becomes uncertain when carriers are in different frequency bands because they may use different RF components, antennas and antenna wiring, etc. which can lead to different latencies. In other words, synchronization between intra-band carrier aggregation component carriers (within the same frequency band) is simpler because the same RF chains and frequency sources can be used (compared with carriers spanning different frequency bands). Thus, when the narrow-bandwidth spectrum block utilizes the same resources (within a single frequency band) as the primary component carrier 121, then the SSB can be scheduled within the primary component carrier 121 and aggregated with the secondary component carrier 122. Further, some network implementations may allow for inter-band carrier aggregation to share the SSB. Thus, the claimed embodiments do not preclude the use of extra narrow-bandwidth frequency resources from a different frequency band, since the implementation of different signaling blocks may enable inter-band carrier aggregation using the narrow bandwidth carrier.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 3.

Wireless devices 120 may be any device, system, combination of devices, or other such communication platform capable of communicating wirelessly with access node 110 using one or more frequency bands deployed therefrom. Each of wireless devices 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as 5G New Radio (NR) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as subcarrier spacing information and associated threshold bandwidth sizes associated with access node 110, carrier aggregation capabilities of wireless devices 120, etc. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
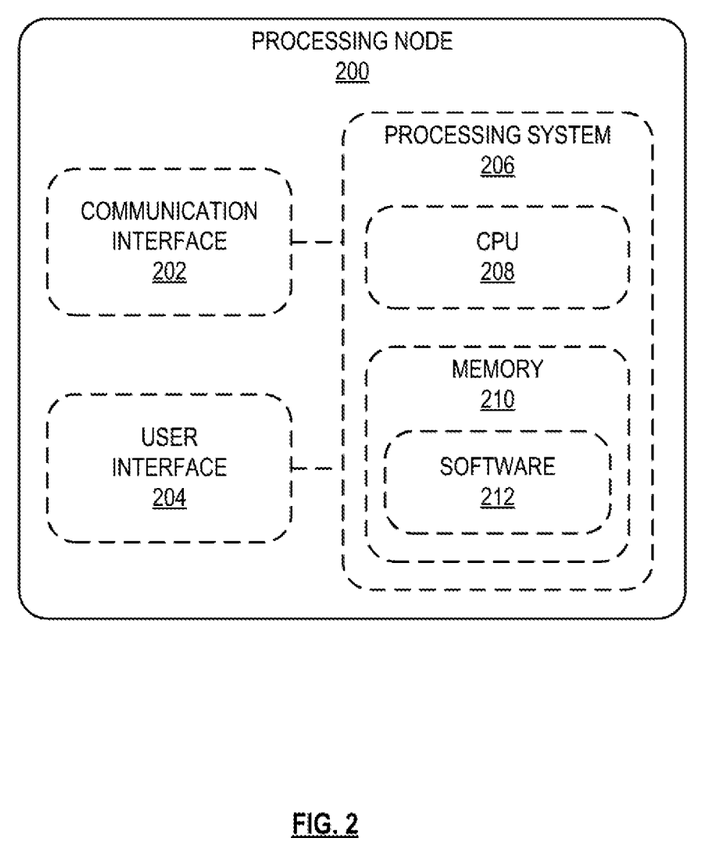
FIG. 2 depicts an exemplary processing node for performing carrier aggregation with narrow bandwidth carriers.

FIG. 2 depicts an exemplary processing node 200 for performing carrier aggregation with narrow bandwidth carriers. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for determining that a spectrum block allocated to a sector has a bandwidth that is narrower than a threshold bandwidth, wherein the sector is configured to deploy a primary component carrier to which wireless devices within the sector are attached, configuring the spectrum block as a narrow bandwidth carrier, and performing carrier aggregation with the narrow bandwidth carrier as a secondary component carrier aggregated with the primary component carrier. In another exemplary embodiment, software 212 can include instructions for determining that a bandwidth of an available spectrum allocated to a wireless sector is unable to accommodate synchronization signals, configuring the available spectrum as a secondary component carrier, and scheduling the synchronization signals within a primary component carrier of the wireless sector. In another exemplary embodiment, software 212 can include instructions for determining that a spectrum block allocated to a sector has a bandwidth that is narrower than a threshold bandwidth, wherein the threshold bandwidth is based on a size of a synchronization signal block (SSB), configuring the spectrum block as a narrow bandwidth carrier, performing carrier aggregation with the narrow bandwidth carrier as a secondary component carrier aggregated with the primary component carrier, and scheduling the SSB within the primary component carrier.

Figure 3:
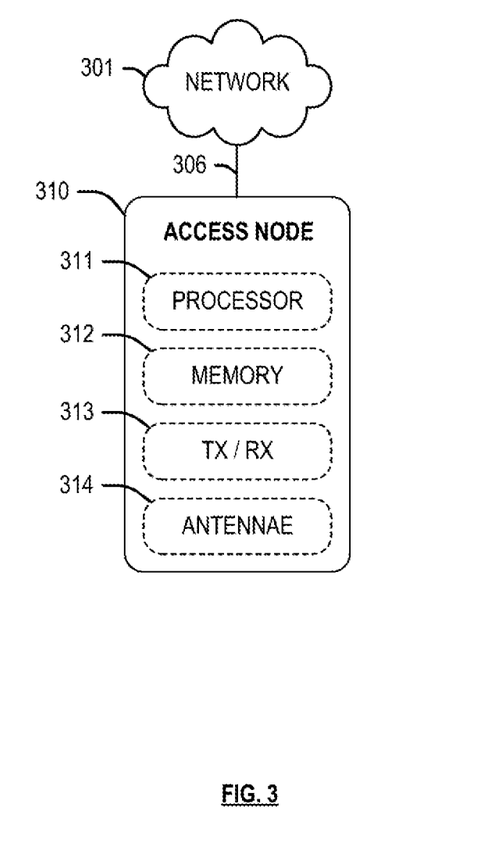
FIG. 3 depicts an exemplary access node for performing carrier aggregation with narrow bandwidth carriers.

FIG. 3 depicts an exemplary access node 310. Access node 310 may comprise, for example, a macro-cell access node, such as access node 110 described with reference to FIG. 1. Access node 310 enables communication with network 301 via communication link 306, and is illustrated as comprising a processor 311, memory 312, transceiver 313, and antennae 314. Processor 311 executes instructions stored on memory 312, while transceiver 313 and antennae 314 enable wireless communication with wireless devices attached to one or more sectors deployed by access node 310. Further, antennae 314 may include an array of antennae that are configured to form beams within the sectors, employ multiple-input-multiple-output (MIMO), etc.

Further, instructions stored on memory 312 can include instructions for determining that a spectrum block allocated to a sector has a bandwidth that is narrower than a threshold bandwidth, wherein the sector is configured to deploy a primary component carrier to which wireless devices within the sector are attached, configuring the spectrum block as a narrow bandwidth carrier, and performing carrier aggregation with the narrow bandwidth carrier as a secondary component carrier aggregated with the primary component carrier. In another exemplary embodiment, memory 312 can include instructions for determining that a bandwidth of an available spectrum allocated to a wireless sector is unable to accommodate synchronization signals, configuring the available spectrum as a secondary component carrier, and scheduling the synchronization signals within a primary component carrier of the wireless sector. In another exemplary embodiment, memory 312 can include instructions for determining that a spectrum block allocated to a sector has a bandwidth that is narrower than a threshold bandwidth, wherein the threshold bandwidth is based on a size of a synchronization signal block (SSB), configuring the spectrum block as a narrow bandwidth carrier, performing carrier aggregation with the narrow bandwidth carrier as a secondary component carrier aggregated with the primary component carrier, and scheduling the SSB within the primary component carrier.

Figure 4:
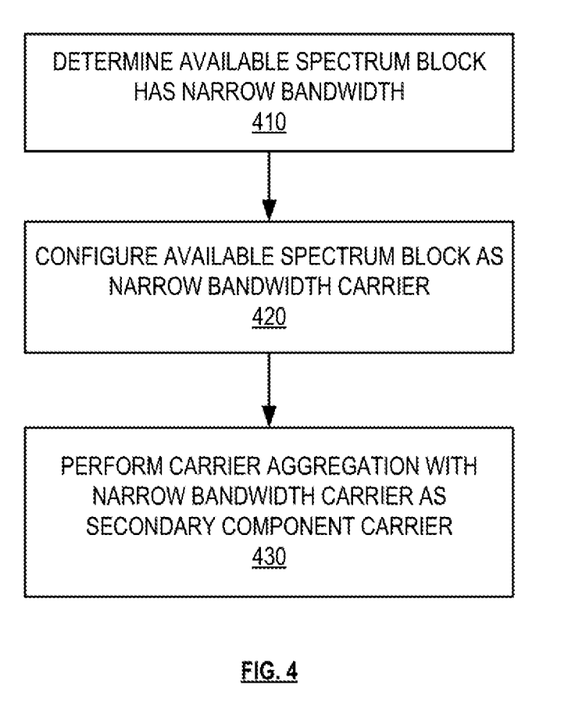
FIG. 4 depicts an exemplary method for performing carrier aggregation with narrow bandwidth carriers.

FIG. 4 depicts an exemplary method for performing carrier aggregation with narrow bandwidth carriers. The method of FIG. 4 may be implemented by an access node (such as access node 110, 310), by a controller node (such as controller node 104), by a processing node (such as processing node 200), or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, it is determined that an available spectrum block has a narrow bandwidth. The available spectrum block may be assigned or allocated to an access node that is configured to deploy one or more carriers. For example, the access node can be configured to deploy a primary component carrier to which wireless devices within the sector are attached. The primary component carrier can include frequency resources that have a bandwidth sufficient to support control signaling for the primary component carrier or any additional carrier (such as one or more secondary component carriers). Further, there may be additional frequency resources (i.e. available spectrum block) allocated for use by the access node, the additional frequency resources being sufficiently narrow that they are unable to be used as an independent or primary component carrier, since they cannot accommodate the necessary signaling transmissions. Determining that the frequency resources of the available spectrum block span a sufficiently narrow bandwidth can be based on comparison with a threshold bandwidth. For example, the threshold bandwidth can include any bandwidth that is wide enough to accommodate synchronization signals for carrier aggregation. In an exemplary embodiment, the synchronization signals comprise a synchronization signal block (SSB). The SSB can include synchronization signals along with a physical broadcast channel (PBCH) that is configured to transmit a master information block (MIB). The synchronization signals can include primary synchronization signals (PSS) and secondary synchronization signals (SSS). Further, the threshold bandwidth can be based on a subcarrier spacing associated with the spectrum block (or frequency band associated with the spectrum block). For example, if the subcarrier spacing is 15 kHz, a corresponding SSB would require 3.6 MHz so the threshold is 5 MHz, and if the subcarrier spacing is 30 kHz, the corresponding SSB would require 7.2 MHz and the threshold bandwidth is 10 MHz. Due to the numerology of 5G NR (as is known to those having ordinary skill in the art), a 15 kHz subcarrier spacing is associated with a channel bandwidth of at least 5 MHz, and a 30 kHz subcarrier spacing is associated with a channel bandwidth of at least 10 MHz. Thus, in exemplary embodiments, a minimum threshold bandwidth for a 15 kHz subcarrier spacing carrier is 5 MHz, and a minimum threshold bandwidth for a 30 kHz subcarrier spacing carrier is 10 MHz. In other words, the threshold bandwidth against which the available spectrum block is compared varies based on a subcarrier spacing utilized by the access node and, correspondingly, a channel bandwidth associated with the subcarrier spacing. In light of the above, additional minimum threshold bandwidths for different subcarrier spacings will be evident to those having ordinary skill in the art. For example, if the subcarrier spacing is 60 kHz, a corresponding SSB would require 14.4 MHz, if the subcarrier spacing is 120 kHz, the corresponding SSB would require 28.8 MHz, if the subcarrier spacing is 240 kHz, the corresponding SSB would require 57.6 MHz, and so on.

At 420, resources within the available spectrum block are configured as a narrow bandwidth carrier. For example, upon determining that the additional frequency resources span a bandwidth that is narrower than the threshold bandwidth, then they are configured as a narrowband carrier. At 430, carrier aggregation is performed with the narrow bandwidth carrier as the secondary component carrier aggregated with the primary component carrier. and aggregated with the primary component carrier. Further, the synchronization signals for carrier aggregation are scheduled using the primary component carrier. The synchronizations signals enable wireless devices to receive a data stream using both component carriers. Further, the available spectrum block used to form the secondary carrier uses the same frequency band as the primary component carrier. This is because the synchronization between component carriers becomes uncertain when the carriers are in different frequency bands because they may use different RF components, antennae, antenna wiring, etc., which can lead to different latencies. In other words, synchronization between intra-band carrier aggregation component carriers in the same frequency band is simpler because the same RF chains and frequency sources can be used (compared with carriers spanning different frequency bands). Thus, when the narrow-bandwidth spectrum block utilizes the same resources (within a single frequency band) as the primary component carrier, then the SSB can be scheduled within the primary component carrier and aggregated with the secondary component carrier. Certain network implementations may allow for inter-band carrier aggregation to share the SSB. Thus, the claimed embodiments do not preclude the use of extra narrow-bandwidth frequency resources from a different frequency band, since the implementation of different signaling blocks and associated threshold bandwidths may enable inter-band carrier aggregation using the narrow bandwidth carrier.

Figure 5:
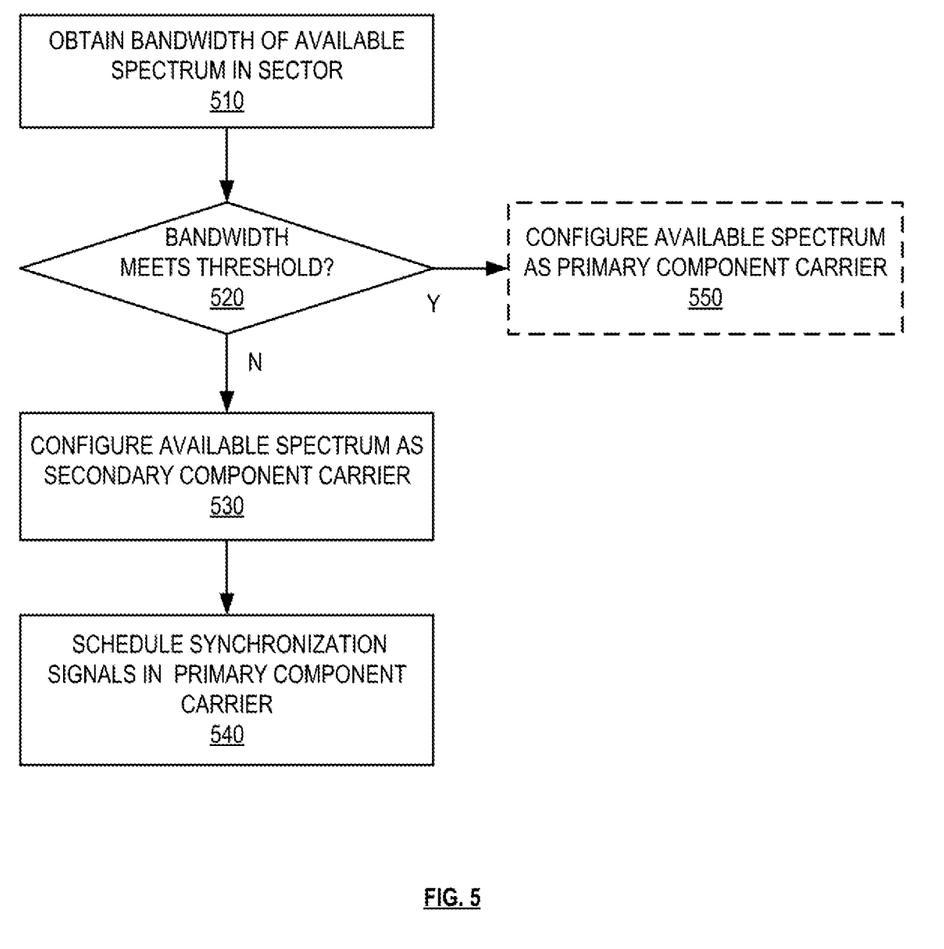
FIG. 5 depicts another exemplary method for performing carrier aggregation with narrow bandwidth carriers.

FIG. 5 depicts another exemplary method for performing carrier aggregation with narrow bandwidth carriers. The method of FIG. 5 may be implemented by an access node (such as access node 110, 310), by a controller node (such as controller node 104), by a processing node (such as processing node 200), or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a bandwidth is obtained for available frequency resources of a spectrum assigned to a sector. The available frequency resources may be assigned or allocated to an access node that is configured to deploy one or more carriers. For example, the access node can be configured to deploy a primary component carrier to which wireless devices within the sector are attached. The primary component carrier can include frequency resources that have a bandwidth sufficient to support control signaling for the primary component carrier or any additional carrier (such as one or more secondary component carriers). Further, there may be additional frequency resources (i.e. available spectrum block) allocated for use by the access node, the additional frequency resources being sufficiently narrow that they are unable to be used as an independent or primary component carrier, since they cannot accommodate the necessary signaling transmissions.

At 520, the bandwidth is compared to a threshold to determine whether or not the bandwidth can accommodate synchronization signals, such as an SSB. For example, the threshold bandwidth can include any bandwidth that is wide enough to accommodate synchronization signals for carrier aggregation. In an exemplary embodiment, the synchronization signals comprise a synchronization signal block (SSB). The SSB can include synchronization signals along with a physical broadcast channel (PBCH) that is configured to transmit a master information block (MIB). The synchronization signals can include primary synchronization signals (PSS) and secondary synchronization signals (SSS). Further, the threshold bandwidth can be based on a subcarrier spacing associated with the spectrum block (or frequency band associated with the spectrum block). For example, if the subcarrier spacing is 15 kHz, a corresponding SSB would require 3.6 MHz, and if the subcarrier spacing is 30 kHz, the corresponding SSB would require 7.2 MHz. Due to the numerology of 5G NR (as is known to those having ordinary skill in the art), a 15 kHz subcarrier spacing is associated with a minimum channel bandwidth of 5 MHz, and a 30 kHz subcarrier spacing is associated with a minimum channel bandwidth of 10 MHz. Thus, in exemplary embodiments, a minimum threshold bandwidth for a 15 kHz subcarrier spacing carrier is 5 MHz, and a minimum threshold bandwidth for a 30 kHz subcarrier spacing carrier is 10 MHz. In other words, the threshold bandwidth against which the available spectrum block is compared varies based on a subcarrier spacing utilized by the access node and, correspondingly, a channel bandwidth associated with the subcarrier spacing. In light of the above, additional minimum threshold bandwidths for different subcarrier spacings will be evident to those having ordinary skill in the art. For example, if the subcarrier spacing is 60 kHz, a corresponding SSB would require 14.4 MHz, if the subcarrier spacing is 120 kHz, the corresponding SSB would require 28.8 MHz, if the subcarrier spacing is 240 kHz, the corresponding SSB would require 57.6 MHz, and so on.

At 530, upon determining that the bandwidth does not meet the threshold, resources within the available spectrum block are configured as a narrow bandwidth carrier and, at 540, carrier aggregation is performed with the narrow bandwidth carrier as the secondary component carrier aggregated with the primary component carrier. and aggregated with the primary component carrier. Further, the synchronization signals for carrier aggregation are scheduled using the primary component carrier. The synchronizations signals enable wireless devices to receive a data stream using both component carriers. Further, if at 520 it is determined that the available spectrum has a bandwidth that meets one or more thresholds, then the available spectrum may be used as a primary component carrier, or any other carrier that is not a narrow bandwidth carrier.

Figure 6A:
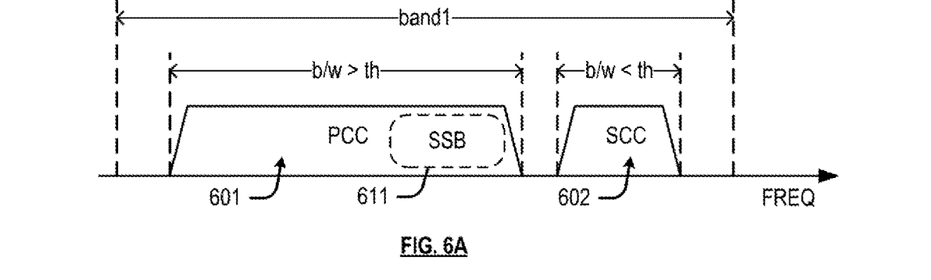
FIGS. 6A-6C depict exemplary narrow bandwidth carriers that are aggregated with primary component carriers.
Figure 6B:
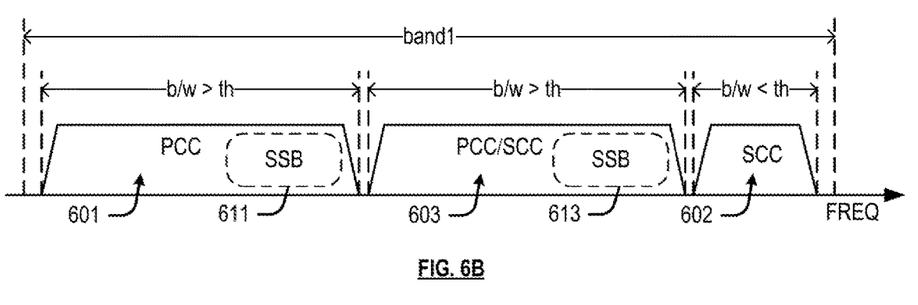
Figure 6C:
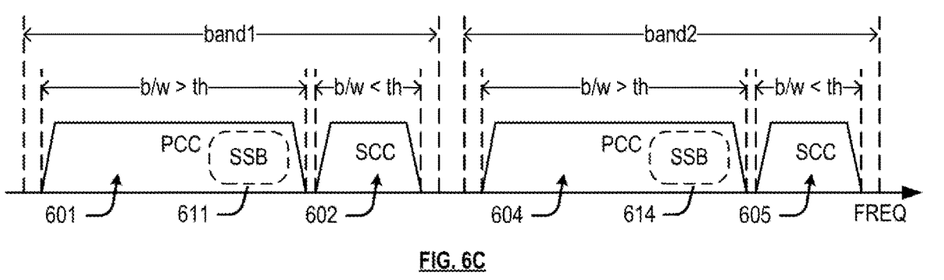

FIGS. 6A-6C depict exemplary narrow bandwidth carriers that are aggregated with primary component carriers. With reference to FIG. 6A, an access node may be configured to utilize a primary component carrier (PCC) 601. The bandwidth of PCC 601 is sufficiently wide to accommodate an SSB 611. Further, an available spectrum block may be configured as a secondary component carrier (SCC) 602, based on determining that a bandwidth of the available spectrum block is less than the threshold size for accommodating SSB 611. SCC 602 can be aggregated with PCC 601, with the synchronization being managed by SSB 611.

With reference to FIG. 6B, the access node can be configured to deploy at least one PCC 601, and has available resources that are sufficiently wide to configure as another PCC 603 (which may also be configured as an SCC). Both PCC 601 and PCC/SCC 603 have a bandwidth wide enough to accommodate SSBs 611/613. Further, an available spectrum block may be configured as a secondary component carrier (SCC) 602, based on determining that a bandwidth of the available spectrum block is less than the threshold size for accommodating SSBs 611/613. SCC 602 can be aggregated with PCC 601 and/or PCC/SCC 603, with the synchronization being managed by SSBs 611/613.

The carriers of FIGS. 6A and 6B are illustrated as being part of the same frequency band (band1). With reference to FIG. 6C, two different frequency bands band1 and band2 may be assigned to or allocated for use by an access node. For example, the access node may be configured to utilize a primary component carrier (PCC) 601 having a bandwidth sufficiently wide to accommodate an SSB 611. Further, an available spectrum block (within band1) may be configured as a secondary component carrier (SCC) 602, based on determining that a bandwidth of the available spectrum block is less than the threshold size for accommodating SSB 611. SCC 602 can be aggregated with PCC 601, with the synchronization being managed by SSB 611. Similarly, the access node may be configured to utilize a PCC 604 (within band2) having a bandwidth sufficiently wide to accommodate an SSB 614. Further, an available spectrum block (within band2) may be configured as a secondary component carrier (SCC) 605, based on determining that a bandwidth of the available spectrum block is less than the threshold size for accommodating SSB 614. SCC 605 can be aggregated with PCC 604, with the synchronization being managed by SSB 614.

Although the narrow-bandwidth carriers of FIGS. 6A-6C are illustrated as being aggregated with PCCs of the same frequency band (intra-band carrier aggregation), the available spectrum block may contain resources from a different frequency band in which case since the synchronization may be more complex. The subject disclosure does not preclude the use of extra narrow-bandwidth frequency resources from a different frequency band.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing carrier aggregation using narrow bandwidth carriers, the method comprising:
   determining that a spectrum block allocated to a sector has a bandwidth that is narrower than a threshold bandwidth, wherein the sector is configured to deploy a primary component carrier to which wireless devices within the sector are attached;
   configuring the spectrum block as a narrow bandwidth carrier; and
   performing carrier aggregation with the narrow bandwidth carrier as a secondary component carrier aggregated with the primary component carrier,
   wherein the threshold bandwidth comprises any bandwidth that is wide enough to accommodate synchronization signals for carrier aggregation.

2. The method of claim 1, wherein the synchronization signals comprise a synchronization signal block (SSB).

3. The method of claim 1, further comprising scheduling the synchronization signals for carrier aggregation using the primary component carrier.

4. The method of claim 1, wherein the threshold bandwidth is based on a subcarrier spacing associated with the spectrum block.

5. The method of claim 4, wherein the subcarrier spacing is 15 kHz and the threshold bandwidth is at least 5 MHz.

6. The method of claim 4, wherein the subcarrier spacing is 30 kHz and the threshold bandwidth is at least 10 MHz.

7. The method of claim 1, wherein the spectrum block and the primary component carrier utilize resources within a single frequency band.

8. A system for performing carrier aggregation using narrow bandwidth carriers, the system comprising:
   a processing node; and
   a processor communicably coupled to the processing node, the processor being configured to perform operations comprising:
   determining that a bandwidth of an available spectrum allocated to a wireless sector is smaller than a threshold bandwidth;
   configuring the available spectrum as a secondary component carrier; and
   scheduling the synchronization signals within a primary component carrier of the wireless sector,
   wherein the threshold bandwidth comprises any bandwidth that is wide enough to accommodate synchronization signals.

9. The system of claim 8, wherein the operations further comprise performing carrier aggregation with the secondary component carrier and the primary component carrier.

10. The system of claim 8, wherein the primary component carrier has a bandwidth that is greater than the threshold bandwidth.

11. The system of claim 8, wherein the synchronization signals comprise a synchronizations signal block (SSB).

12. A processing node for performing carrier aggregation with narrow bandwidth carriers, the processing node being configured to perform operations comprising:

determining that a spectrum block allocated to a sector has a bandwidth that is narrower than a threshold bandwidth, wherein the threshold bandwidth comprises any bandwidth that is wide enough to accommodate a size of a synchronization signal block (SSB);

configuring the spectrum block as a narrow bandwidth carrier;

performing carrier aggregation with the narrow bandwidth carrier as a secondary component carrier aggregated with a primary component carrier; and scheduling the SSB within the primary component carrier.

13. The processing node of claim 12, wherein the threshold bandwidth is based on a subcarrier spacing associated with the spectrum block.

14. The processing node of claim 13, wherein the subcarrier spacing is 15 kHz and the threshold bandwidth is 5 MHz.

15. The processing node of claim 13, wherein the subcarrier spacing is 30 kHz and the threshold bandwidth is 10 MHz.

16. The processing node of claim 12, wherein the spectrum block and the primary component carrier utilize resources within a single frequency band.

17. The processing node of claim 16, wherein the operations are repeated for a different spectrum block and different primary component carrier operating within the sector and being part of a different single frequency band.

18. The method of claim 1, wherein the spectrum block and the primary component carrier utilize resources within different single frequency bands.

* * * * *